Patented Sept. 5, 1933

1,925,472

UNITED STATES PATENT OFFICE 1,925,472

PROCESSES FOR CONVERTING COCA ALKALOIDS INTO ALKYLATED DERIVATIVES OF ECGONINE AND PSEUDO-ECGONINE

Auguste Tirard, St.-Ouen, France, assignor to Societe Anonyme Etablissements Roques, St.-Ouen, France No Drawing. Application July 10, 1930, Serial No. 467,143, and in France June 25, 1930

4 Claims. (Cl. 260—25)

It has long since been made known by Liebermann and Giesel, German Patent No. 47,602 and U. S. Patent No. 450,887 of April 21, 1891 that through the action of alkalies the amorphous coca alkaloids may be divided in two parts viz in ecgonine and organic acids.

On the other hand Boehringer & Soehne, German Patent #55,338-Eichorn and Marquardt, Berichte XXIII (1890) page 468 have disclosed that said alkaloids are converted in dextro-ecgonine or pseudo-ecgonine by the prolonged action of concentrated alkalies.

My invention has for its object the direct conversion into ecgonine methylic ester of the greater part of the amorphous alkaloids (so-called secondary alkaloids) which are found with cocaine in the coca leaves, by treatment with alkalies in a solution of methylic alcohol or any other alcohol capable of dissolving the alkalies.

Another characteristic of my invention consists in the use of very small quantities of alkali which are sufficient to cause said conversion, the latter thus consisting in a catalytic alcoholisis of the alkaloids. These alkaloids separate into methylic esters of the acid radicals connected to the ecgonine nucleus and in ordinary levo-methyl-ecgonine.

I have now found moreover that unlike the ecgonine which necessitates a prolonged heating with a large excess of alkali in order to be converted in dextro-ecgonine or pseudo-ecgonine, methylated ecgonine is very sensitive to the action of alkalies of which a small quantity of methylic solution is sufficient to cause its progressive conversion into dextro-methylated-ecgonine (or d. ψ methyl-ecgonine). There is in this case a secondary catalytic isomeration effect upon the levo-ester formed in the first place in the division due to the action of the alkalies. This is a general property of the alkyl-ecgonines.

Consequently, according to the quantity of alkali used and to the duration of its effect the prevailing end product obtained will be at will either levo-methyl-ecgonine corresponding to natural cocaine or its dextro rotary isomere (d. ψ methyl-ecgonine).

On its part, the alkali which has been added disappears gradually while saponifying a portion of the esters produced in the preceding stage of the alcoholysis. This disappearance of the free alkali may be rapid if the temperature is raised. The division in two parts practically ceases when the alkali has disappeared, although a very slow action is still apparent owing to autocatalysis of the divisible alkaloids when the same are still existent.

Oxides and alcoholates of alkali and alkaline earth metals, ammonia, certain amines and quaternary ammonium hydrates may be used as catalysts. Any alcohol capable of dissolving the catalyst may also be used as solvent of the alkaloids in the place of methylic alcohol.

The corresponding cocaines may be produced without difficulty by benzoylating according to the usual methods the ecgonine or pseudo-ecgonine esters.

I will now describe by way of example a mode of execution of the present process.

To 10 kgs. of amorphous coca alkaloids dissolved in 20 kgs. of methyl alcohol is added a concentrated caustic soda methyl alcohol solution in the proportion of 2 gr. of NaOH per kg. of alkaloids.

After three days contact at the ordinary room temperature (15 to 20° C.) the quantity of hydrochloric or sulfuric acid required for neutralizing the alkali is then added to the mixture and the methyl alcohol is completely distilled off. Benzene is added to the residue and the solution is stirred with water acidulated with hydrochloric acid without any substantial excess in order to eliminate the basic products. There remains only aromatic esters in the benzene.

Ammonia is gradually added to the acid solution with agitation as long as a reaction takes place and a turbidity is present due to the separation of unattached amorphous alkaloids. Thereafter the unattached alkaloids thus separated are removed by agitation with benzene in which they dissolve. Said alkaloids are separated from the solvent by distillation and may be treated in a new process.

The alkaline solution is then saturated with potassium carbonate which causes separation of the methylated ecgonine which is also recovered by stirring with benzene. The solvent is distilled off in vacuum.

The methylecgonine thus produced may be directly submitted to benzoylation or purified by conversion in hydrochloride.

When it is desired to produce a greater proportion of methylpseudoecgonine (d. ψ ecgonine) a greater proportion of alkali must be employed. The mode of operation is the same as above described but at the end of the first three days of contact there will again be added 20 grs. of NaOH per kg. of alkaloids which are left to act during a week, at the end of that time the operation is begun to recover the methylpseudoecgonine which is preferably removed from the mixture by agitation with chloroform in a manner similar to that in which the left methylecgonine is removed by benzene.

What I claim and desire to secure by Letters Patent of the United States is:

1. A process for converting the coca alkaloids into alkylated derivatives of ecgonine and dextro pseudo-ecgonine which consists in treating the alkaloids dissolved in an alcohol with small quantities of a compound having a strongly alkaline reaction, acting catalytically in homogeneous medium at room temperature and for a prolonged period to produce alcoholysis of said alkaloids and subsequent isomerization of the alkyl-ecgonine first produced.

2. A process for converting the alkaloids of coca into dextrorotary pseudo ecgonine esters, which comprises subjecting these alkaloids to alcoholysis, and subsequently catalytically forming the isomers of the alkyl-ecgonines first formed by contacting the same with an alkaline catalyst at room temperature and for a prolonged period.

3. A process for converting alkaloids of coca into alkylated derivatives of ecgonine which comprises treating the alkaloids dissolved in an alcohol at room temperature and for a prolonged period in the presence of small quantities of a compound having a strongly basic reaction which acts as an alkaline catalyst and causes the alcoholysis of said alkaloids.

4. A process for converting alkaloids of coca into alkylated derivatives of dextro pseudo ecgonine which comprises treating the alkaloids dissolved in an alcohol in the presence of small quantities of a compound having a strongly basic reaction which acts as an alkaline catalyst and causes the alcoholysis of said alkaloids by simple digestion at room temperature and subsequently catalytically forming the isomers of the alkyl-ecgonines first formed by continued contact for a prolonged time with the alkaline catalyst.

AUGUSTE TIRARD.